Patented May 21, 1946

2,400,748

UNITED STATES PATENT OFFICE 2,400,748

PROCESS AND PRODUCT OF DEHYDRATING FOODSTUFFS

Earl W. Flosdorf, Upper Darby, Pa., assignor to Lyophile-Cryochem Company, Philadelphia, Pa., a corporation of Pennsylvania No Drawing. Application August 12, 1943, Serial No. 498,419

6 Claims. (Cl. 99—199)

This invention relates to improvements in the desiccation of meat, solid vegetables, fruit and vegetable juices, milk and other food products, by desiccation from the frozen state, in other words, by removal of water by sublimation while the material undergoing desiccation is frozen.

Biologicals are preserved by processes involving this type of desiccation on a rather large scale, and the extent to which these processes are used for this purpose is expanding. In the most widely used processes, the biological is frozen in containers, a number of containers are placed in a vacuum chamber, and a high vacuum produced therein. The material may be prefrozen, or it may be frozen by the cooling effect produced by the application of the vacuum with consequent rapid evaporation of water. In either case, the major desiccation proceeds from a frozen state.

Heat is usually supplied to the material undergoing desiccation by circulating a heating fluid in a jacket around the chamber or by having heating fins or shells which extend into the chamber. It has been found, however, that it is necessary to avoid direct contact of the container with any heating fluid or surface maintained at an elevated temperature, for example, a temperature above 80° C. If the container comes into contact with such a heating fluid or hot surface, a portion of the material at the surface apparently melts, with the result that its desiccation does not proceed from the frozen state and the product is regarded as of no value for biological purposes, because the portion which is so desiccated does not reconstitute readily upon the addition of water, or loses in activity or other essential property.

One of the major difficulties in the application of this process to the preservation of food stuffs, for example, meat, is the long period of time required for the desiccation to proceed to completion, with consequent small capacity of any given equipment or the requirement of an extremely large amount of expensive equipment for the treatment of a relatively small amount of product.

Thus in the processing of biologicals, for example, it is common to process certain products in 500 cc. containers holding about 300 cc. of material, and or the desiccation of this material to take anywhere from 1 to 4 days.

The process of the present invention provides improvements in such desiccation processes which so speed up the desiccation operation as to make its application to the preservation of meat or the like commercially feasible, reducing the time required for the desiccation of a given quantity of material to a small fraction of the time required in the processes heretofore used. The invention is based upon the discovery that with a product such as ground meat, the frozen material may be kept in direct contact with a highly heated surface, for example, a metal surface heated by steam at 45 pounds pressure, without impairing the quality of the product produced. A superior product results because the food is reduced more quickly to stable, dry condition. This appears by virtue of the fact that enzymatic changes in uncooked or raw meat proceed even in the frozen state. Accordingly, the more quickly dryness is reached, the sooner these changes are arrested. Similar enzymatic changes occur in unblanched vegetables.

In carrying out the new process the meat or the like will usually be placed in trays of good heat-conducting material which are supported on hollow shelves of good heat-conducting material within a vacuum chamber, the spaces within the shelves being adapted for the circulation of a heating medium such as high pressure saturated steam. The intimate contact of the frozen material with the metal tray, which in turn rests upon the metal shelf, permits relatively efficient transfer of heat from the heating medium to the frozen material. Similarly, the material may be placed in direct contact with hot walls of a vacuum drum which itself rotates or has rotating panels or the like within it, or both, or the material may be placed on a hot moving belt contained within a vacuum chamber. In the latter case, there may be a plurality of heated zones, each at different degrees of temperature, e. g., an initial cold zone.

Upon application of the high vacuum to the frozen material, the desiccation proceeds rapidly, the relatively large amount of heat required to supply the latent heat of sublimation being efficiently supplied by the high temperature heating medium, in contrast with the methods heretofore used, in which the heat has been supplied by radiation or relatively cool heating media, for example, cold or warm water or warm air.

The product produced by the process is dissimilar to the products heretofore produced, and for that reason, the process is probably not applicable to the disiccation of biologicals, for example. Thus instead of having a characteristic porous structure throughout, it has a porous structure throughout the major portion of the mass, but has a non-porous, rather shiny or glazed pellicle at all surfaces in contact with the tray or other supporting means. It is possible that this pellicle results from the desiccation of that portion of the mass from a non-frozen state, but the exact reason for its formation is not definitely known. In any event, the product, upon restoration by the addition of water, reverts to a condition quite similar to fresh meat, but differing therefrom in some respects, as will be pointed out. Advantageously, in the case of meat, the raw material should be chosen from grades with a suitable percentage of fat. If it is too lean, the final product lacks in savoriness and is too dry when cooked; if it is too high in content of fat initially, the lyophobic fat surrounds the individual lyophile protein particles and other constituents and interferes with proper reconstitution.

In carrying out the process, it is advantageous to freeze the meat by auto-refrigeration, i. e., by the cooling produced by evaporation under vacuum, rather than by freezing by exposure to a refrigerant. In the case of vegetables, it depends upon a particular product, e. g., a better product is obtained from pre-frozen peas, but in the case of string beans, they are better vacuum frozen. In the case of diced carrots, the two procedures seem to be about equivalent.

Thus the meat, usually but not necessarily ground, may be placed in metal trays in layers about ¾ inch deep, and these trays placed on hollow shelves in a vacuum chamber. The chamber is then sealed, and a vacuum gradually applied. The application of the vacuum causes water to evaporate from the meat with cooling thereof. The meat is soon cooled to or below its freezing point, and freezes. The vacuum is thereafter maintained sufficiently high to cause the water to sublime from the frozen material, heat sufficient to supply the latent heat of sublimation being supplied by circulating a high temperature heating medium through the spaces in the hollow shelves, for example, saturated steam at 30 pounds pressure. When nearly all of the water has been so removed from the meat, its temperature starts to rise, goes above the freezing point, and continues to rise as heat is supplied thereto. This takes place because with the small amount of water remaining in the meat, the rate of vaporization is greatly reduced, as is the cooling effect of the vaporization. Despite the rise in temperature which takes place, the material retains its dry appearance, as its water content is low. The application of the vacuum is continued, even after the meat has reached a temperature substantially in excess of 0° C., advantageously until at least the exterior portions thereof reach a temperature of 50 to 65° C., at which time it may be regarded as adequately dried. At this time, the temperature of the interior portions may be around 30 to 35° C. For the best final product, the meat in no part should be brought to a temperature above about 80° C. Advantageously, by controlling the thickness of the layer of meat in relation to the temperature of the heating medium, the circulation of the steam may be stopped at a time which will result in the hottest part of the meat reaching a temperature not above the maximum permissible, yet with all the meat being brought to a temperature at least as high as that required for rapid reduction of the final moisture content of the entire mass to below the minimum for best keeping qualities. For example, when drying a layer of ground beef ¾" thick, with a total drying time of five hours, using steam at 50# pressure the steam may be discontinued at 4½ hours. At this time, the hottest portion of the meat next to the steam shelf is at about 30° C. and the coldes portion (center of layer) is at about —5 or 0° C. At five hours, the hottest portion will have reached about 50 to 60° C. and the center will have reached 35° C. The moisture content then will be below 1.0 to 1.5%.

This low content of moisture is desirable. Above 4 or 5% moisture, enzymatic changes can occur in unblanched vegetables and in uncooked meat. Below 1 to 1½% is necessary for complete stability, preferably below 0.5%.

If the thickness of the layer is not controlled in this fashion, e. g., if it is too thick, it is necessary to discontinue use of the hot steam medium too early to have efficient drying. To avoid overheating of the dry portion, it becomes necessary toward the end of drying to change to a cooler heating medium, such as water at 80° C. in order to complete the drying of the inner portions of the layer. This results in a longer total drying time with reduced output by the machine by virtue of this inefficiency in the latter stages of drying. Also, a poorer product results.

The degree of vacuum required during the process will vary, but the pressure must be below the vapor pressure of ice at the temperature of the meat, which will average about —5 to —10° C. for most efficient operation. It is to be understood that within a layer of frozen meat being desiccated as described, there will be considerable variations in temperature, and there will be changes in the temperature gradient as the desiccation proceeds. For example, in the later stages of the process, both the upper and lower surfaces may have temperatures as high as 20° C., while the interior portions are still at —20° C. A most important requirement is that all portions, except those immediately in contact with the tray, be kept at the freezing point or below until the water content thereof is reduced to the point where, when the temperature rises above 0° C., the product appears to be dry. This ordinarily corresponds to the point at which about 90 to 95% of the water originally present has been removed. Ordinarily, for the process to proceed properly, it is necessary that the vapor pressure of the water in the vacuum chamber be below about 3 mm., and that the water vapor formed be rapidly removed, as by condensation by a cold condenser interposed between the vacuum chamber and the vacuum pump, by absorption or adsorption by a desiccant, such as Drierite or silica gel, interposed between the vacuum chamber and the vacuum pump, by direct pumping by a large capacity vacuum pump capable of handling water vapor, such as a pump of the type described in the Coleman Patent 2,227,441, a pump of the type described in the Flosdorf and Hull application Serial No. 437,146, filed April 1, 1942, a steam jet, or the like. Methods of handling the water vapor, and removing it from the vacuum chamber are well known, and require no detailed description.

The temperature of the heating medium used in carrying out the process may be varied over a considerable range, depending on several factors; for the efficient, rapid operation contemplated by the invention, however, it is necessary that the temperature be about 100 C. or higher. Advantageously, wet or saturated steam at about 30 pounds is used, its temperature being about 120 C. or somewhat higher. Super-heated water (water above its normal atmospheric boiling point, but under a pressure greater than atmospheric) in certain cases has special merit. The maximum temperature, of course, is that beyond which the heat input exceeds the absorption of heat through sublimation, so that no more than a thin pellicle is desiccated from a non-frozen state. With apparatus yet available, this appears to be about 150° C. with wet or saturated steam. Of course, with less efficient heating media, such as superheated steam or hot gases, the temperature of the heating medium may be considerably higher, the effective heat transfer, nevertheless, being the same as that of the wet or saturated steam in the range of 100 to 150° C.

By this process, it is possible to desiccate meat in substantial quantities in five hours, or even less.

The dried product, being an edible product, does not require the aseptic handling required with biologicals. It is dry, and therefore not readily subject to decay or the like through the action of bacteria or fungae, nor through autolysis or simple decomposition. It is, however, hygroscopic, and therefore should be handled and stored, as in hermetically sealed containers, by means which prevent undue exposure to the air and minimize the amount of water the product may absorb from the air. An advantageous way of handling the dry product is that described in my application Serial No. 490,329, filed June 10, 1943. In sealed containers, the product has excellent keeping properties, retaining its flavor and wholesomeness for long periods of time, even in warm climates.

Addition of water to the dried product restores it to a condition which approximates that of fresh, raw meat. The restored product differs from fresh meat in certain respects. To some people, the flavor of the restored product is superior to that of raw meat. It cooks more rapidly than fresh meat. On cooking, there is a readier separation of intercellular fat than there is with raw meat, and this fat is released in an unemulsified condition, separating clearly. As a result, a greater proportion of the water containing soluble constituents remains in the cooked product. The cooked product thus contains less fat and more of the meat juices than does cooked fresh meat—a characteristic which is an advantage particularly in the case of pork.

These differences between fresh meat and the restored product seem to result from the breaking of cells during the process, and from the lyophobic nature of the fatty constituents of the meat, which, on restoration by the addition of water, do not revert to their original state, as do the protein and other lyophile constituents.

It also appears that the restored product cooks faster than does fresh meat, perhaps because of the breaking of the cells, or the faster release of the fatty materials, or the presence of "free" water in the restored product.

To obtain the best restored product, less water is added than was removed in the desiccation operation, but the amount to be added will depend, to a considerable extent, upon personal taste. One reason for adding less water is that less is removed with the fat in cooking—giving a product with a more pronounced flavor and containing a larger proportion of the constituents of the meat juices.

I claim:

1. A process of extracting water from frozen food material which comprises supporting the material on a surface of a heat-conducting member within a chamber maintained under high vacuum, continuously transferring heat from a heating medium through said member to the material supported thereon, said heating medium being at a temperature above about 100° C. and sufficiently high, and the area of the surface on which the material is supported being sufficiently extensive, that sufficient heat is transferred through said supporting member to the material supported thereon to supply the latent heat of sublimation to the material, and maintaining all of the material containing the water, except a surface pellicle thereof in contact with the heat-conducting member, frozen while the latent heat of sublimation is supplied thereto by heat conducted from the heating medium through said member and said surface pellicle, whereby water progressively is removed from the material by sublimation, the various portions of the material, except said surface pellicle, being maintained in the frozen state until at least 90% of the water originally present in such portions has been removed by sublimation.

2. A process of extracting water from frozen food material which comprises supporting the material on a surface of a heat-conducting member within a chamber maintained under high vacuum, continuously transferring heat from a heating medium through said member to the material supported thereon, said heating medium being at a temperature above about 100° C. and sufficiently high, and the area of the surface on which the material is supported being sufficiently extensive, that sufficient heat is transferred through said supporting member to the material supported thereon to supply the latent heat of sublimation to the material, maintaining all of the material containing the water, except a surface pellicle thereof in contact with the heat-conducting member, frozen while the latent heat of sublimation is supplied thereto by heat conducted from the heating medium through said member and said surface pellicle, whereby water progressively is removed from the material by sublimation, the various portions of the material, except said surface pellicle, being maintained in the frozen state until at least 90% of the water originally present in such portions has been removed by sublimation, thereafter extracting further amounts of water from the various portions of the food product under the high vacuum with resulting rise in temperature of the food product in such portions above its freezing point, and discontinuing such further extraction of water before the temperature of any of the various portions of the food product exceeds 80° C.

3. A process of extracting water from frozen food material which comprises supporting the material on a surface of a heat-conducting member within a chamber maintained under high vacuum, continuously transferring heat from a heating medium through said member to the material supported thereon, said heating medium being at a temperature above about 100° C. and sufficiently high, and the area of the surface on which the material is supported being sufficiently extensive, that sufficient heat is transferred through said supporting member to the material supported thereon to supply the latent heat of sublimation to the material, maintaining all of the material containing the water, except a surface pellicle thereof in contact with the heat-conducting member, frozen while the latent heat of sublimation is supplied thereto by heat conducted from the heating medium through said member and said surface pellicle, whereby water progressively is removed from the material by sublimation, the various portions of the material, except said surface pellicle, being maintained in the frozen state until at least 90% of the water originally present in such portions has been removed by sublimation, thereafter extracting further amounts of water from the various portions of the food product under the high vacuum with resulting rise in temperature of the food product in such portions above its freezing point until the water content of such portions has been reduced to less than 4% of that originally present.

4. A process of extracting water from frozen food material which comprises supporting the material on a surface of a heat-conducting member within a chamber maintained under high vacuum, continuously transferring heat from a heating medium through said member to the material supported thereon, said heating medium being at a temperature above about 100° C. and sufficiently high, and the area of the surface on which the material is supported being sufficiently extensive, that sufficient heat is transferred through said supporting member to the material supported thereon to supply the latent heat of sublimation to the material, maintaining all of the material containing the water, except a surface pellicle thereof in contact with the heat-conducting member, frozen while the latent heat of sublimation is supplied thereto by heat conducted from the heating medium through said member and said surface pellicle, whereby water progressively is removed from the material by sublimation, the various portions of the material, except said surface pellicle, being maintained in the frozen state until at least 90% of the water originally present in such portions has been removed by sublimation, thereafter extracting further amounts of water from the various portions of the food product under the high vacuum with resulting rise in temperature of the food product in such portions above its freezing point until the water content of such portions has been reduced to less than 1.5% of that originally present, the various portions of the material being maintained at a temperature below about 80° C. during the entire extraction of water therefrom.

5. A process of dehydrating frozen meat which comprises grinding the meat to be dehydrated, supporting the ground meat on a surface of a heat-conducting member within a chamber maintained under high vacuum, continuously transferring heat from a heating medium through said member to the ground meat supported thereon, said heating medium being at a temperature above about 100° C. and sufficiently high, and the area of the surface on which the ground meat is supported being sufficiently extensive, that sufficient heat is transferred through said supporting member to the ground meat supported thereon to supply the latent heat of sublimation to the ground meat, and maintaining all of the ground meat containing the water, except a surface pellicle thereof in contact with the heat-conducting member, frozen while the latent heat of sublimation is supplied thereto by heat conducted from the heating medium through said member and said surface pellicle, whereby water progressively is removed from the ground meat by sublimation, the various portions of the ground meat, except said surface pellicle, being maintained in the frozen state until at least 90% of the water originally present in such portions has been removed by sublimation.

6. As a new product, uncooked dehydrated meat containing less than 4% of the moisture originally present, said meat having a porous interior and at least one non-porous surface pellicle, the inter-cellular fat of the meat being in a lyophobic condtion and the protein portions in a lyophilic condition, such that when the dehydrated meat is restored by the addition of water, the intercellular fat is present in a form easily separable by heating.

EARL W. FLOSDORF.